(12) United States Patent
Eloo et al.

(10) Patent No.: US 9,821,503 B2
(45) Date of Patent: Nov. 21, 2017

(54) MELT PROCESSING PLANT
(71) Applicant: Gala Industries, Inc., Eagle Rock, VA (US)
(72) Inventors: Michael Eloo, Xanten (DE); Juergen Veltel, Kevelaer (DE)
(73) Assignee: GALA INDUSTRIES, INC., Eagle Rock, VA (US)
( * ) Notice: Subject to any disclaimer, the term of this patent is extended or adjusted under 35 U.S.C. 154(b) by 61 days.
(21) Appl. No.: 14/655,117
(22) PCT Filed: Feb. 21, 2014
(86) PCT No.: PCT/EP2014/000464
§ 371 (c)(1),
(2) Date: Jun. 24, 2015
(87) PCT Pub. No.: WO2014/127918
PCT Pub. Date: Aug. 28, 2014
(65) Prior Publication Data
US 2015/0321410 A1  Nov. 12, 2015
(30) Foreign Application Priority Data Feb. 21, 2013 (DE) .................... 20 2013 001 692 U

(51) Int. Cl.

| | |
|---|---|
| B29C 47/74 | (2006.01) |
| B29C 47/76 | (2006.01) |
| B29B 17/00 | (2006.01) |
| B29C 47/08 | (2006.01) |
| B29C 47/70 | (2006.01) |
| B29B 9/06 | (2006.01) |
| B29C 47/00 | (2006.01) |

(52) U.S. Cl.
CPC ............ B29C 47/745 (2013.01); B29B 9/065 (2013.01); B29B 17/0005 (2013.01);
(Continued)

(58) Field of Classification Search
CPC ....... B29C 47/70; B29C 47/74; B29C 47/745; B29C 47/76; B29C 47/761; B29C 47/0816; B29C 47/0874; B29B 9/06; B29B 9/065
(Continued)

(56) References Cited

U.S. PATENT DOCUMENTS 6,787,073 B1 * 9/2004 Tadler ..................... B29B 9/06
264/13
6,787,673 B2  9/2004 Fukushima et al.
(Continued)

FOREIGN PATENT DOCUMENTS

| | | |
|---|---|---|
| CN | 101119832 | 2/2008 |
| DE | 1937862 | 2/1971 |

(Continued)

*Primary Examiner* — Matthew Daniels
*Assistant Examiner* — Lawrence D Hohenbrink, Jr.
(74) *Attorney, Agent, or Firm* — Jacobson Holman, PLLC.

(57) ABSTRACT

A melt processing plant is provided that includes a melt charger for charging a processing head, in particular a pelletizing head, with melt, in which a diverter valve for discharging the melt during a starting and/or retooling phase is associated to the melt charger upstream of the processing head. A splitter divides the discharged melt into melt portions with the melt channels of the splitter head having at least one step-like cross-sectional enlargement of their inflow portion, a cross-sectional shape different from the outlet cross-section of the discharge channel, and an open orifice region out of the splitter.

38 Claims, 12 Drawing Sheets

(52) U.S. Cl.
CPC ...... *B29C 47/0816* (2013.01); *B29C 47/0874* (2013.01); *B29C 47/70* (2013.01); *B29C 47/74* (2013.01); *B29C 47/76* (2013.01); *B29C 47/761* (2013.01); *B29B 9/06* (2013.01); *B29C 47/0009* (2013.01); *B29C 47/0011* (2013.01); *Y02W 30/62* (2015.05)

(58) Field of Classification Search
USPC ............................................................ 425/225
See application file for complete search history.

(56) References Cited

U.S. PATENT DOCUMENTS

| | | | | |
|---|---|---|---|---|
| 2005/0110182 A1* | 5/2005 | Eloo | ....................... | B29B 9/065 264/69 |
| 2013/0203942 A1* | 8/2013 | Paul | ....................... | B29B 7/7495 525/332.3 |
| 2014/0175695 A1* | 6/2014 | Eloo | ................... | B29B 17/0005 264/143 |

FOREIGN PATENT DOCUMENTS

| | | | |
|---|---|---|---|
| DE | 202009011114 | 2/2011 | |
| DE | 202011104968 | 11/2012 | |
| DE | 202011104968 U1 * | 11/2012 | ......... B29B 17/0005 |
| EP | 1970180 | 9/2008 | |
| GB | 2009972 | 1/1979 | |
| JP | H07227844 | 8/1995 | |
| WO | WO 01/10620 | 2/2001 | |

* cited by examiner

MELT PROCESSING PLANT

BACKGROUND OF THE INVENTION

Field of the Invention

The present invention relates to a melt processing plant, comprising a melt charger for charging a processing head, in particular pelletizing head, with melt, wherein upstream of the processing head a diverter valve for discharging the melt during a starting and/or retooling phase is associated to the melt charger.

Such melt processing plants can be configured differently and in particular be formed as pelletizing plants for example in the form of underwater pelletizing plants, wherein depending on the application different materials can be processed as melt, for example thermoplastics, polymer compounds and mixtures with and without additives, such as in the form of expandable polymers mixed with propellant, melt compounds mixed with fibers or other materials processable in the melt condition, in particular plastic melts. As an alternative to such pelletizing plants, the melt processing plant can, however, also be formed as pipe extrusion plant or blown film plant, in which a corresponding extrusion head or a film blowing head is provided as processing head. Depending on the application, said processing head of the melt processing plant also can comprise another forming tool, by means of which the melt is formed or molded in the desired way.

Such melt processing plants usually are operated with a diverter valve, so that when starting the plant, retooling the plant for example to another pelletizing head or processing head, changing the melt for example from a colored melt to a non-colored melt, or in an other change-over operation, in which the plant cannot be run in the stationary operating condition or in the set operating point, the melt delivered by the melt charger can be discharged past the at least one processing head. Such processing heads like underwater pelletizing heads are relatively sensitive when they are charged with melt deviating too much from the target state, for example too cold melt or as a result too viscous melt, which for example can lead to a clogging of the die plate.

The diverter valve usually is arranged in the conveying path from the melt charger, for example an extruder, and the processing head, wherein in addition to a feed or supply outlet, which is connectable with the processing head, the diverter valve comprises at least one discharge outlet which discharges the melt past the processing head. Via such discharge outlet, which can open into the surroundings and/or leads away or branches off from the proper process route of the melt processing plant or the connection between melt charger and a processing head, material or melt material not suitable for the further processing in a processing head of the melt processing plant can be kept away from the processing head and can be discarded, so to speak, wherein that the melt to be separated in this way may be treated as scrap material, for example because the melt does not yet have the correct temperature and/or still contains unmolten pieces and/or contains color impurities and/or the processing in the pelletizing or processing head has adverse properties. The inlet channel of the diverter valve connectable with the melt charger can selectively be connected with the feed channel or with the discharge channel by an adjustable switch for example in the form of a rotary vane or the like. Such diverter valve is known for example from the document EP 1 970 180. A generic diverter valve furthermore can also assume a distribution function or serve as distributor valve, in particular be connectable with a plurality of processing heads via a plurality of processing outlets, so as to be able to supply melt guided through the diverter valve to various processing heads, in order to be able to each properly process the melt.

The melt discharged from such diverter valve sometimes is simply drained to the ground, where depending on the duration of the starting operation the melt spreads to form more or less large plates or lumps, which after solidification must be removed from the ground and be comminuted, which naturally is very expensive. As an alternative to simply draining to the ground, it is sometimes also provided to put collecting tanks for example in the form of traveling chutes below the discharge valve, which then, as soon as they are filled, are moved away and replaced by a new, empty tank. Moving away the tanks with usually still liquid melt is very dangerous in terms of safety, since melt may spill out of the tank. On the other hand, handling problems arise after cooling and solidification of the melt, since very large blocks are obtained, which first must be removed from the tank and then be chopped into handleable pieces, so that the same can be recycled.

The document WO 01/10620 proposes to split the melt scrap, which is discharged via the diverter valve, by means of a splitter into handy pieces which via a chute are conveyed into a collection basket with water jet pressure and a gush of water flowing off. The splitter comprises a reciprocable carriage with two melt channels which on reciprocation of the carriage alternately can be brought in flow connection with the discharge channel coming from the diverter valve, so that the melt alternately flows through the one and then through the other melt channel and corresponding melt portions are obtained. At the same time, a stationary perforated plate is provided at the outlet of the melt channels, which on reciprocation of the carriage alternately closes and clears the outlets of the melt channels, so that melt clots exiting from the melt channels are cut off at the edge of the perforated plate.

In such known melt splitter, however, similar problems in turn occur as with a pelletizing head. On the one hand, the splitter head is hard to clean after an operating cycle. When the starting process of the plant is terminated and the diverter valve no longer discharges the melt as scrap, but passes the same through to the pelletizing head, melt residues will solidify in the splitter head for lack of any further supply of melt, so that in the next starting process of the plant clogging of the splitter head would threaten without cleaning and the bypass function of the diverter valve no longer would be ensured. On the other hand, pressure pulsations can occur on splitting of the material to be discharged, when on reciprocation of the splitter head the flow connection of the melt channels is changed or the melt channels are not completely open. On the other hand, the melt clots can again stick together on the discharge chutes, when the water jet or the gush of water down the chute is not strong enough.

SUMMARY OF THE INVENTION

It is the object underlying the present invention to create an improved melt processing plant and an improved method as mentioned above, which avoids the disadvantages of the prior art and develops the latter in an advantageous way. In particular, splitting of the scrap melt should be made less susceptible to failure and as maintenance-free as possible and should function properly even in the case of greatly fluctuating scrap melt mass flows.

According to the invention, this object is solved by a melt processing plant comprising a melt charger for charging a processing head, in particular a palletizing head, with melt. Between the melt charger and the processing head, a diverter valve is provided for discharging the melt past the processing head, and a splitter is provided for splitting the discharged melt strand flowing out of the diverter valve into melt portions, preferably of about the same size. The splitter includes a movable splitter head with a plurality of melt channels. By moving the splitter head, a respective one of the melt channels is each cyclically brought into flow connection with a discharge channel coming from the diverter valve. The melt channels of the splitter head at least have a step-like cross-sectional enlargement in their inflow portion, a cross-sectional shape different from the outlet cross-section of the discharge channel, and an open orifice region out of the splitter.

It is proposed to form the splitter head such that the split melt clots of the scrap melt at least partly are detached from the channel walls when they still are in the melt channels of the moving splitter head and, driven by gravity, can exit from the splitter head more easily. The various melt channels of the splitter head, which alternately get in connection with the discharge channel coming from the diverter valve, are contoured in a special way, so that sticking of the splitter head becomes unlikely and cleaning of the same becomes unnecessary or at least considerably easier. According to the invention, the melt channels of the splitter head at least have a step-like cross-sectional enlargement in their inflow portion, a cross-sectional shape different from the outlet cross-section of the discharge channel, and an open orifice region out of the splitter. Due to the step-like cross-sectional enlargement together with the cross-sectional shape of the melt channels different from the discharge channel, the melt or a split melt clot more easily can detach from the walls of the splitter head. At the same time, the melt portions can exit from the melt channels of the splitter head unimpededly, as the orifices of the melt channels are open and free from barriers in any position of the splitter head and are not impeded by perforated plates or cutting knives. The tear-off of melt, by which the melt strand ultimately is split into the desired melt portions, substantially occurs directly at the interface between discharge channel and moving splitter head.

In accordance with a development of the invention, said step-like cross-sectional enlargement in the inflow portion of the melt channels of the splitter head can include a tear-off edge with overhang or an overhanging, undercut melt cliff, in the region of which the melt at least partly detaches from the melt channel walls and downstream of which the freely hanging melt drips off or, driven by gravity, at least partly is driven through the melt channels or out of the melt channels without wall contact.

To further support the tear-off of melt or the detachment of melt from the channel walls, the melt channels of the splitter head in the region of the step-like cross-sectional enlargement not only can abruptly change their cross-sectional dimension or their cross-sectional area, but also can change their cross-sectional shape. Upstream and downstream of said step-like cross-sectional enlargement, the melt channels formed in the splitter head can have various cross-sectional shapes, for example in one portion be contoured round or rounded on the circumference and in another portion be contoured with corners.

In particular, upstream of the cross-sectional enlargement the melt channels can have an at least partly rounded cross-sectional shape and downstream of the cross-sectional enlargement a polygonal cross-sectional shape. Due to such a transition from a round cross-sectional shape to an angular cross-sectional shape abrupt cross-sectional enlargements occur in particular in the regions of the added corners, which the melt material cannot follow, so that an improved detachment of the melt portions occurs.

In quantitative terms, said at least one step-like jump in cross-section is designed such that the melt strand passing the cross-sectional enlargement cannot follow the jump in cross-section and a detachment occurs. In particular, downstream of the step-like cross-sectional enlargement, said melt channels each can have a cross-sectional area which amounts to at least two times, preferably more than three times the outlet cross-sectional area of the discharge channel coming from the diverter valve, in particular when said discharge channel is viewed in its opening cross-section. Such tripling or multiplication of the channel cross-section ensures a reliable exit of the melt clots in particular also towards the end of the starting process, when no more melt is discharged and is fed into the splitter head.

In an advantageous development of the invention, a jump in cross-section in particular occurs right at the interface between the discharge channel coming from the diverter valve and the moving splitter head, when a respective melt channel in the splitter head is in flow connection with said discharge channel. In particular, the inflow cross-sections of the melt channels of the splitter head each—i.e. not in sum with each other, but each as such—can be greater than the outlet cross-section of said discharge channel. Said outlet cross-section of the discharge channel, which with a corresponding splitter head position opens into one of the melt channels of the splitter head, itself can form a tear-off edge at which the melt strand detaches from the channel wall, so that the melt strand then enters into the melt channel of the splitter head at least partly without wall contact.

The oversize of the inflow cross-sections of the melt channels of the splitter head as compared to the outlet opening of the discharge channel in principle can be dimensioned differently, but preferably is at least ¼ of the discharge channel outlet cross-sectional area, i.e. each of the melt channels has an inflow cross-sectional area of at least 125% of the outlet cross-sectional area of the discharge channel. Preferably, the cross-sectional area of each melt channel at its inflow opening also can amount to 200% or more of the outlet cross-sectional area of the discharge channel.

The inlet opening of the melt channels advantageously partly is adapted in shape to the contouring of the outlet cross-section of the discharge channel, but partly contoured different therefrom. In particular, the inlet openings of the melt channels of the splitter head can be adapted in shape to the contour of the discharge channel on the sides which on opening of the respective melt channel first open towards the discharge channel. This leads to the fact that when the splitter head is moved relative to said discharge channel to such an extent that the opening cross-section of the discharge channel is cleared completely, the transition from the still partly covered position to the completely open position occurs abruptly, namely when the portion adapted in shape of the inlet opening of the melt channel of the splitter head completely sweeps over the outlet cross-section of the discharge channel. A slow clearing of the discharge channel effected little by little thereby is avoided, as it would occur for example in the case of a straight inlet edge which would sweep over a rounded outlet edge.

In an advantageous development of the invention, the inlet openings of the melt channels of the splitter head each can be—roughly spoken—contoured in a V-shaped manner, in particular in the form of a V rounded at the tip, or have an approximately parabolic contouring which at its culmination point is adapted to the roundness of the outlet cross-section of the discharge channel.

The V-shaped contouring advantageously is arranged symmetrically to the direction of movement of the splitter head. When the splitter head is reciprocated linearly in the manner of a carriage, the linear axis of movement forms the center line of said V-contour. When the carriage is movable rotatorily, the circumferential direction or a tangent thereto forms the center line to said V.

The V-shaped contouring is oriented such that during the opening movement of the splitter head the—rounded—tip of the V runs ahead.

The melt channels provided in said splitter head in principle can be formed in a conventional way as tubular channels completely closed on their circumference. Alternatively, said melt channels according to a development of the invention can, however, also be formed open on the circumference towards one side and/or have an open circumferential sector of e.g. 10% to 50% of the channel circumference. When formed as carriage, in particular the channel walls arranged towards the end faces of the carriage, i.e. towards the sides located on the end face in direction of travel, can be missing or the channels can be formed open towards said end faces. A circumferential side of the channel open towards an outside of the splitter head provides for considerably easier cleaning.

By providing a plurality of melt channels in the splitter head, advantageously at least one melt channel always can at least partly be kept open, whereby a continuous discharge of the melt from the diverter valve becomes possible and—in particular in connection with said cross-sectional enlargement—pressure fluctuations due to cyclic impoundment are avoided. If one of the melt channels has just been shut off or is impaired in its outlet cross-section by the separating means, the melt can flow off via another melt channel, so that on the whole a continuous discharge from the diverter valve can be realized. Portioning occurs due to the cyclic shut-off or the cyclic separation of the melt strand, since always only a defined melt volume can exit from the respective melt channel, before the further exit is inhibited or the succeeding stream of material is separated.

The splitter head can be associated to the shut-off valve in different ways. According to an advantageous embodiment of the invention, the splitter head can be arranged and movably mounted relative to the shut-off valve downstream of the orifice region of the discharge channel of the diverter valve, advantageously directly adjoin its orifice region, advantageously such that depending on the position of the splitter head a respective other melt channel can be brought in flow connection with the discharge opening of the diverter valve. In such an embodiment, a shut-off of one or more melt channels of the splitter head can be achieved by shifting or moving the distributor head relative to the diverter valve. The shut-off means here are formed by the interface between diverter valve and distributor head, wherein a respective melt channel of the distributor head is cleared when it is at least partly brought in alignment with the discharge channel of the diverter valve, whereas the melt channel is shut off when it is brought out of alignment with the discharge channel of the diverter valve.

The distributor head, however, need not necessarily be directly brought in connection with the discharge opening of the diverter valve. Advantageously, there can also be provided an intermediate piece which is firmly connected with the diverter valve and comprises a discharge channel communicating with its outlet channel, which then can be brought in flow connection or out of flow connection with the melt channels provided in the distributor head by moving the distributor head as mentioned above. In this way, the splitter can be formed as an independent assembly, in which the interfaces to the movable splitter head are not specified by the diverter valve, but can suitably be adapted by said intermediate or adapter piece.

Advantageously, the diameter of the discharge channel also can suitably be adapted by said intermediate piece. In particular, the discharge channel in said connecting piece can provide a nozzle-shaped formation and/or a cross-sectional taper of the melt channel provided towards the outlet, whereby shutting off or separating the melt strand can be facilitated.

Advantageously, the cross-sectional contour of said discharge channel can be formed in various ways, in order to contour the outer contour or shape of the melt clots in the desired way. In particular, said discharge channel can have a nozzle-shaped taper at its outlet, which then is adjoined by an at least approximately cylindrical outlet portion, wherein here cylindrical can mean, but need not mean circular cylindrical, as depending on the desired melt clot shapes various basic cross-sectional contours can be used.

Independent of said nozzle-shaped taper and/or the succeeding outlet portion with approximately constant cross-section, the discharge channel preferably can have a rounded or approximately round cross-sectional contour at its outlet according to an advantageous embodiment of the invention, in particular be contoured circular or oval or elliptical or also be rounded in an s-shaped manner or contoured in a blossom-shaped manner. As an alternative to such round cross-sectional shapes, the discharge channel also can have an angular cross-sectional contour, preferably in the outlet region, in particular can have a rectangular or square or triangular or polygonal or star-shaped or x-shaped contour. In a development of the invention, mixed forms of the aforementioned cross-sectional contourings also are possible, e.g. on one side with two corners in the manner of an angular U and rounded on an opposite side. For example, there can also be provided an approximately cross-shaped cross-sectional contouring, in which the inner corners and/or the outer corners can be rounded.

In a development of the invention, the discharge channel also can have a ring-shaped cross-sectional contouring and/or be formed as ring nozzle, so that the melt strand to be split is produced in the manner of a hollow hose and correspondingly melt portions hollow on the inside can be produced. Said ring-shaped cross-sectional contouring of the discharge channel, preferably at the outlet, can be formed round or angular as mentioned above. The inner shell surface and the outer shell surface of the ring-shaped cross-sectional contouring can be formed or contoured corresponding to each other, e.g. be contoured circular on the inside and on the outside or be contoured star-shaped on the inside and on the outside. Alternatively, however, the inner and outer shell surfaces of the ring contour can be contoured different from each other, for example such that the ring gap on the inner shell surface is contoured circular and on the outer shell surface is contoured star-shaped or angular. In principle, all the aforementioned cross-sectional contourings can be combined with each other.

In an advantageous development of the invention, the size of the nozzle orifice or the outlet cross-section or the discharge channel can be formed adjustable, in particular the diameter and/or the cross-sectional area and/or the degree of taper of the nozzle portion, i.e. the ratio of inlet to outlet diameter of the nozzle portion, can be formed adjustable, in order to be able to adapt the discharge channel and/or its outlet cross-section to the swelling behavior of the respective melt to be processed. Said adjustability can be realized easily by attachable adapter pieces or replaceable discharge channel inserts. Alternatively or in addition, continuously adjustable solutions e.g. in the manner of a drill chuck also can be provided.

Alternatively or in addition, the distributor head can be integrated into the diverter valve, in particular such that the diverter valve comprises two or more than two discharge channels which selectively, in particular alternatively, can be brought in flow connection and out of flow connection with the inlet channel of the diverter valve by shifting the valve body or the distributor switch of the diverter valve. For example, the diverter valve can comprise an inlet channel connectable with the melt charger, at least one feed channel connectable with the processing head and at least two discharge channels, wherein by at least one valve body for example in the form of a valve slide and/or a rotary vane the inlet channel selectively can be switched through to the feed channel or one of the two discharge channels. Advantageously, there can be provided a common movable valve body, which jointly accomplishes the opening or shut-off of the various channels. By cyclically reciprocating the valve body between a position in which the inlet channel is switched through to the first discharge channel and a second position in which the inlet channel is switched through to the second discharge channel, portioning of the melt discharged from the diverter valve can be accomplished. Advantageously, the size of the melt portions can be controlled by the speed or frequency with which the valve body is reciprocated.

As an alternative to such formation integrated into the diverter valve, said splitter head also can form a separate assembly, which on the outlet side is put onto the discharge opening or discharge openings of the diverter valve.

The splitter head, the intermediate or adapter piece and the connecting parts of the diverter valve in principle can be fabricated of different materials, wherein in particular for the splitter tools and connecting pieces in the friction pairing high-temperature steels can be used, which corresponding to the properties of the plastic melts to be processed can be designed wear-resistant, corrosion-resistant or with a combination of both. Such high-temperature steel also can be expedient for other components which move relative to each other and form a friction pairing, for example the corresponding components of the pelletizing head.

To selectively adapt the component properties to the plastic melts to be processed, the corresponding components, in particular the splitter head and said intermediate or adapter piece and the corresponding connecting pieces also can be provided with a surface coating or a function layer. In particular, the splitter tools and connecting pieces in the friction pairing can be adjusted to the corresponding properties of the plastic melts by means of a function layer, so that adhesion, cohesion, accretions, wear, diffusion, corrosion, welding pick-up and/or seizure of the friction pairings relative to each other or onto each other are avoided or at least reduced, but also especially the detachment of the plastic melt from the cutting and/or melt clot deflecting region is promoted and sticking is avoided.

If said splitter head is movably arranged relative to the diverter valve in the aforementioned manner, the splitter head advantageously can be part of a cart or carriage which can reciprocably be driven by a carriage drive. The carriage in particular can be reciprocated such that in alternation another of the plurality of melt channels of the splitter head can each be brought in flow connection with a discharge opening of the diverter valve, while at least one other melt channel of the splitter head is each brought out of flow connection with the discharge opening of the diverter valve. In principle, the driving device for such reciprocatingly movable carriage can be formed in different ways, for example operate hydraulically, pneumatically, electrically or mechanically or by a combination thereof, or in some other way be actuated with external energy. According to an advantageous embodiment of the invention, for example a pressure medium cylinder can be provided, by means of which the splitter head can be reciprocated along a predetermined linear path of movement, wherein said path of movement in particular can be straight, but possibly also be arcuately curved.

Alternatively or in addition to such carriage solution, the splitter head can also be rotatably mounted and be driven rotatorily, preferably continuously, by a rotary drive. The splitter head can be formed in the manner of a turret head which includes a plurality of melt channels on a common pitch circle around the axis of rotation and is arranged relative to the diverter valve such that the orifice of the discharge channel of the diverter valve lies on said pitch circle, so that by rotating the distributor head various melt channels one after the other can be brought in flow connection with the discharge channel of the diverter valve.

The rotary drive likewise can be formed differently, for example operate hydraulically, pneumatically, electrically or in a combination of said possibilities, for example comprise a rotator which is mechanically connected with the rotatable splitter head via belts, gear wheels or in some other way by a transmission.

In an advantageous development of the invention, the size of the melt portions can variably be controlled by varying the speed of movement or the movement frequency of the splitter head relative to the diverter valve. When the speed of movement or movement frequency is increased, smaller melt portions can be achieved, whereas larger melt portions can be achieved by slowing down said speed of movement or movement frequency.

In an advantageous development of the invention, said speed of movement and/or movement frequency of the splitter head can automatically or semi-automatically be controlled by a control device, in particular in dependence on a detected melt portion size, a melt portion weight or a melt portion volume and/or in dependence on a melt mass flow which is discharged. In particular, the speed of movement or movement frequency can be increased, when the melt portions become too large and/or when the melt feed stream increases. For this purpose, the size of the portioned melt pieces can be detected, for example by particle size determination carried out optically or in some other way. Alternatively or in addition, the melt mass flow can be determined, which is provided by the melt charger and/or discharged by the diverter valve.

To have the melt portions exiting from the splitter head solidify or harden as fast as possible at least one the outside to such an extent that the material pieces no longer stick together and are easy to handle, a cooling device for cooling the melt portions to at least partly solidified chunks of material is provided in a development of the invention.

The cooling device for cooling the portioned melt volumes in principle can be formed in different ways and can comprise various cooling devices connected in series or in parallel.

In accordance with a development of the invention, said cooling device can already cool the melt strand exiting from the diverter valve, while the melt strand is divided into portions by the portioning device. Alternatively or in addition, cooling also can start already shortly before portioning and/or be performed shortly after portioning. In principle, the cooling means provided in the orifice region of the diverter valve and/or in the region of the portioning device can be formed in different ways, wherein said cooling means in particular can comprise an air and/or gas cooler for charging the melt with cooling air and/or cooling gas, for example in the form of a cooling air blower and/or a cooling air suction device. Alternatively or in addition, the cooling means can comprise a liquid cooler for charging the melt with a cooling liquid, advantageously in the form of a liquid sprayer, which comprises at least one spray nozzle which can be directed onto the melt strand exiting from the diverter valve. Alternatively or in addition, said cooling means also can comprise a contact cooler which comprises a cooling surface contacted by the exiting melt strand. In particular, said contact cooler can be integrated into the orifice region of the diverter valve and/or into the aforementioned splitter head, in particular into its orifice region, in order to cool the orifice regions of the corresponding melt channels.

Alternatively or in addition to cooling the melt on portioning, the cooling device also can cool the melt pieces portioned already, which possibly can already be solidified at least in part. In particular, downstream of the portioning device a cooling bath can be provided, into which the portioned melt pieces are immersed, in order to release heat to the cooling liquid and thereby cool down. By such cooling bath, heat can be withdrawn from the portioned melt pieces particularly efficiently due to the liquid contact.

In an advantageous development of the invention, said cooling bath is arranged below the portioning device and is reachable by the melt portions by gravity. Correspondingly, a transport device actuated by external energy can be omitted between portioning device and cooling bath. In particular, the cooling bath can be arranged substantially vertically below the portioning device, so that the melt portions can fall into the cooling bath in free fall. Possibly, the melt portions can also be passed into the melt bath via a chute, wherein said chute can have a more or less acute-angled inclination to the vertical.

Depending on the volume and the cooling liquid used, the cooling bath can maintain the necessary temperature without special cooling means. Possibly the cooling bath can be formed with two circuits, wherein a secondary cooling circuit with a heat exchanger arranged outside the cooling bath and/or a heat exchanger arranged within the cooling bath for cooling the primary cooling liquid can be associated to the cooling bath. If an underwater pelletizer is used, the water circuit of the pelletizer can be used for cooling the cooling bath.

In principle, the heat withdrawn from the melt portions or chunks of material might simply be removed by dissipation, for example by a corresponding heat exchange with the ambient air. In an advantageous development of the invention, however, the heat to be withdrawn from the melt portions or chunks of material can be recovered and selectively be used at another point of the processing plant or the facilities equipment, at which heat is required or heating is necessary. For this purpose, a heat recovery means can be associated to the cooling device, which selectively recovers and stores the heat obtained on cooling and/or uses the same at a plant and/or building part to be heated or transfers the heat to said plant or building part.

In principle, the heat recovery can be effected at various points and be associated to various cooling means of the cooling device. In particular, the recovery can be effected in the region of the at least one cooling bath, to which at least one heat exchanger can be associated in the primary and/or secondary circuit, via which the heat is recovered. Alternatively or in addition, a heat recovery can also be effected via a corresponding heat exchanger in the region of the pre-cooling, for example the aforementioned contact cooler, with which the melt strand to be portioned is cooled in the region of the diverter valve and/or the portioning device.

The heat recovered for example can be used for preheating the drying air, which for example is used by means of a blower, in a downstream drying station in which the cooled and solidified chunks of material are to be dried. If an underwater pelletizer is used, the recovered heat can alternatively or additionally be used for preheating the water circuit of the underwater pelletizer. Alternatively or in addition, the processing head of the melt processing plant can be heated by the recovered heat. Alternatively or in addition to heating such processing plant components, the recovered heat can however also be used for example to heat the factory hall or to support the heating of buildings.

To facilitate and/or automate the further handling of the chunks of material solidified and cooled in the cooling bath, a removal conveyor is provided in accordance with a development of the invention for removing the chunks of plastic material from the cooling bath. In principle, said removal conveyor can be formed in different ways, for example comprise at least one collecting sieve formed and drivable in the manner of a fishing net, which can be immersed into the cooling bath and skim off the chunks of material present there. In accordance with a development of the invention, in particular a belt conveyor can however advantageously be provided, with which the chunks of material present in the cooling bath are removed from the cooling bath.

In accordance with a development of the invention, the belt conveyor can comprise a collecting belt portion inclined at an acute angle to the horizontal and extending through the level of the cooling bath, which collects and removes chunks of material floating on the cooling bath. Advantageously, the removal conveyor or a separate function module can comprise circulating means associated to the cooling bath, in order to circulate the cooling bath and due to the circulation bring chunks floating on the water onto the conveyor. In particular, the circulating means can be formed such that a flow moving towards the collecting belt portion is generated. Said circulating means for example can comprise revolving blades or the like, which for example can be connected with a deflection pulley or a deflection roller of the belt conveyor.

To be able to also remove sinking chunks of material, the belt conveyor alternatively or in addition to said collecting belt portion obliquely extending through the level can comprise a collecting portion arranged at the bottom of the cooling basin, which substantially is arranged horizontally or only slightly inclined to the horizontal, in particular covers the bottom of the cooling basin, so that sinking chunks of material necessarily get onto said collecting belt portion.

To carry along the chunks of material to be collected despite the resistance of water, the belt conveyor can comprise carriers mounted on the revolving conveying means, for example in the form of protrusions which protrude upwards from the top strand. Advantageously, such carriers for example can be formed in the form of a rake or in the form of a perforated flight, so as not to exert too strong a circulating effect onto the liquid bath.

In accordance with a development of the invention, the revolving means of the belt conveyor is formed liquid-permeable or not liquid-retaining. In particular, the revolving conveying means can comprise recesses through which water initially standing on the conveying means can flow off. For example, a perforated conveyor belt can be provided, for example in the form of a textile belt. Alternatively or in addition, a strip-type belt conveyor can be provided, in which the conveyor belt is formed of a plurality of straps extending one beside the other, so that the liquid can flow off through the gaps between the straps. Alternatively or in addition, the top strand of the belt conveyor also can have a slight transverse inclination and/or be curved slightly convex in cross-section, so that water standing on the conveyor belt can flow off towards the side.

To prevent the chunks of material to be carried along from laterally falling or rolling down, lateral flights can be associated to the conveyor belt, for example in the form of a railing, wherein advantageously an at least small gap is provided between the conveyor belt and the border, so as to allow liquid to flow off towards the side. The size of the gap is adapted to the chunks to be removed, so that said chunks cannot slip through.

In accordance with a development of the invention, a cooling device and/or a drying device can be associated to said removal conveyor, in order to further cool and/or dry the removed chunks of material. Possibly, such further cooling device and/or drying device can be provided after a further cooling bath, into which a first portion of the removal conveyor delivers the chunks from the first cooling bath or from a front cooling bath. To achieve an energy-efficient and thermally equally effective cooling by a plurality of cooling baths, the cooling baths arranged one after the other can have a successively lower temperature, i.e. a second cooling bath can have a lower temperature than a first cooling bath, a third cooling bath can have a lower temperature than the second cooling bath, etc.

The aforementioned further cooling device and/or drying device, which are associated to the removal conveyor after the first or a further cooling bath, can be formed differently in principle. For example, corresponding cooling means can comprise an air and/or gas cooler for charging the chunks of material conveyed by the removal conveyor with cooling air or cooling gas. Alternatively or in addition, a liquid cooler can be provided for charging the chunks of material conveyed by the removal conveyor with cooling liquid. Alternatively or in addition, a contact cooler can be provided, for example in the form of a cooled conveyor belt.

To achieve drying of the cooled chunks of material, a drying station arranged downstream of the removal conveyor can be provided, which dries the chunks of material deposited by the removal conveyor. In an advantageous development, such drying station can comprise a centrifugal drier, a cyclone separator or also a moving drier, which for example can be formed as shaker and shakes or vibrates the chunks of material, in order to mechanically shake off liquid droplets still adhering to the chunks of material.

Alternatively or in addition to such drying station arranged downstream of the removal conveyor, a continuous drier can also be provided, which is associated to a removal conveyor portion and dries the chunks of material, while the same are removed. Such continuous drier for example can comprise an air drier, for example in the form of a blower, an extractor and/or a cyclone separator. Alternatively or in addition, a radiation dryer can be provided, which at least partly dries the chunks of material conveyed on the removal conveyor for example by infrared radiation. Alternatively or in addition, the continuous drier also can be formed as moving drier or include such moving drier, for example in the form of a vibrating line, which can form part of the removal conveyor. For example, a portion of the removal conveyor can be formed as vibratory or shaking conveyor.

To avoid undesired reactions of the melt exiting from the discharge channel or of melt clots exiting from the splitter, e.g. in the form of degradation effects or the exit of volatile constituents of the melt, an atmosphere generator can be associated to or provided downstream of the splitter, which charges the exiting melt or the split melt portions with a defined atmosphere. Such atmosphere for example can have a certain chemical composition, e.g. comprise or consist of an inert or shielding gas and/or comprise certain pressure conditions. For example, the exiting melt or a correspondingly split melt clot can be charged with a shielding gas or also be pressurized with air, i.e. be exposed to an overpressure, or also be exposed to a negative pressure or a vacuum.

Depending on the desired atmosphere, into which the melt portions are to exit, the atmosphere generator can comprise various charging means. In a development of the invention, the outlet region of the splitter can be charged or provided with a gas shower, for example to charge the split melt clots with a shielding gas. Alternatively or in addition, the outlet region of the splitter can be formed encapsulated, in order to prevent that the melt portions get in contact with the surrounding atmosphere or vice versa volatile constituents exiting from the melt get into the surrounding atmosphere.

Such encapsulation can be realized for example by a preferably gas-tight container which is connected to the splitter, so that the split melt portions get into the interior space of the container. Depending on the aftertreatment carried out, said container can be connected to the succeeding treatment station or also enclose the same, e.g. be connected with the tub of the aforementioned liquid dipping bath and/or with said bathtub form a preferably gas-tight envelope which can be connected to the splitter or a plant component present in the region of the splitter.

For this purpose, a container is provided at the outlet of the portioning device, which correspondingly receives the melt portions and these portions thereby are inertized by a defined atmosphere, a defined overpressure of e.g. compressed air or by a suitable shielding gas. This gas either can flow with neutral pressure, in order to take up the exiting volatile constituents and/or counteract degradation effects, or however largely enclose these constituents in the melt portions by means of overpressure. The principle of such covering and/or overpressure with the gas or compressed air can be realized variably.

When the container below the portioning device cannot be dimensioned so large that all portions can be taken up and can both cool down and "degas" sufficiently, the succeeding tanks and conveyors also can be charged in the same way, in order to prevent the aforementioned effects.

BRIEF DESCRIPTION OF THE DRAWINGS

The invention will subsequently be explained in detail with reference to preferred exemplary embodiments and associated drawings. In the drawings.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
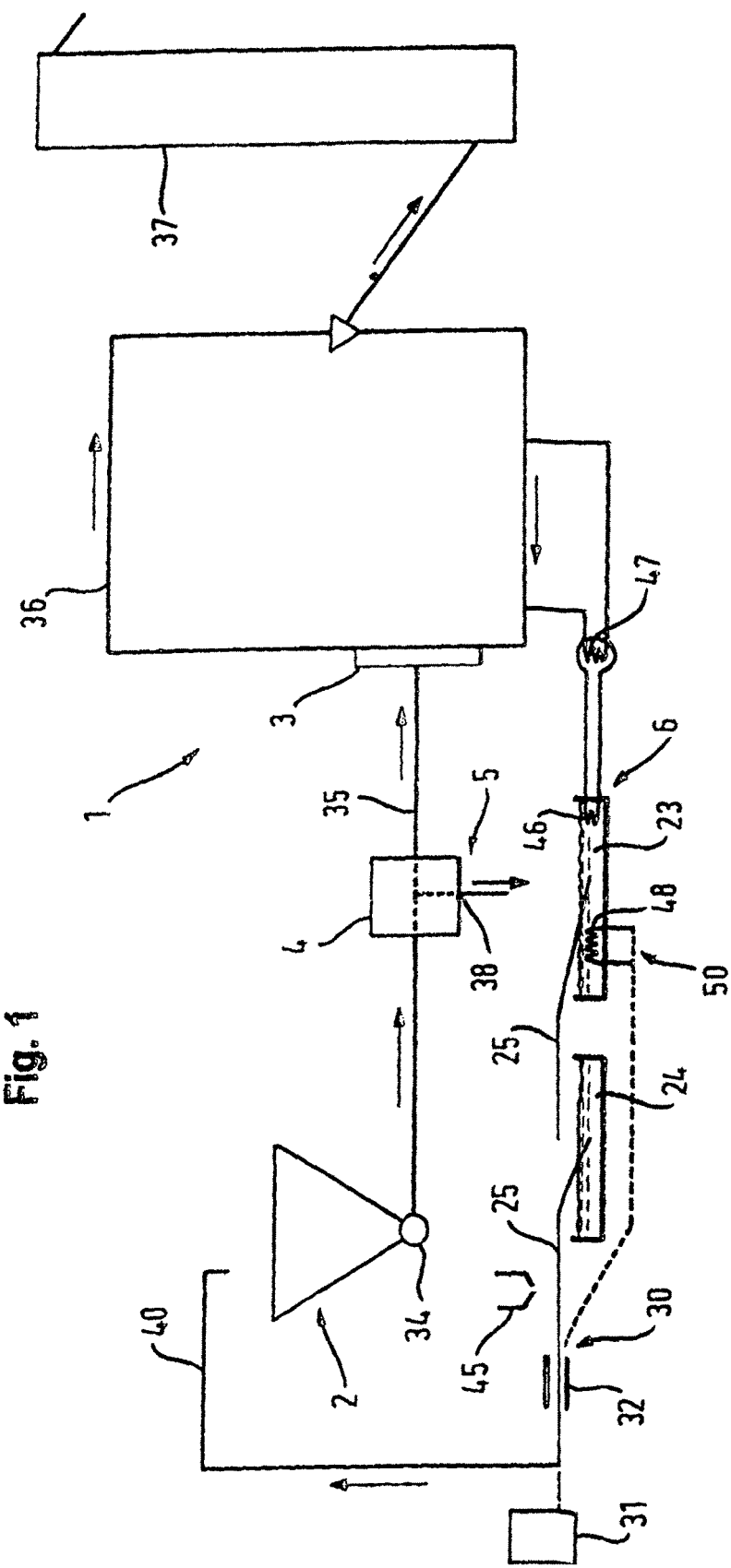
FIG. 1: shows a schematic representation of a melt processing plant in the form of an underwater pelletizing plant according to an advantageous embodiment of the invention, in which a melt charger charges an underwater pelletizing head with melt via a diverter valve by pelletizing the melt to obtain granules.

As shown in FIG. 1, a melt processing plant according to an exemplary embodiment of the invention can be formed as underwater pelletizing plant 1. A melt charger 2, which for example can comprise an extruder 34, supplies melt to a pelletizing head 3 of the underwater pelletizer via a supply channel 35, which in the pelletizing head 3 in a manner known per se is pressed through a die plate with a plurality of bores and is cut into pellets by a pelletizing knife, which pellets are carried away from the pelletizing head 3 by the water circuit 36 of the pelletizing plant 1 and can get into a drier 37, for example a centrifugal dryer, in which they are dried.

To ensure that the melt can be discharged past the pelletizing head 3 when starting the process or during a retooling phase, a diverter valve 4 is provided between the melt charger 2 and the pelletizing head 3, which in the operating position switches through the supply channel 35 between melt charger 2 and pelletizing head 3, but in the diverting or discharging or bypass position discharges the melt coming from the melt charger 2. For this purpose, the diverter valve 4 comprises at least one bypass channel with a discharge opening 38 beside at least one inlet channel and at least one feed channel, cf. FIG. 1. The diverter valve 4 also might possess a plurality of inlet channels and/or a plurality of feed channels, to possibly be able to connect a plurality of melt chargers 2 with a plurality of pelletizing heads 3 or to distribute the melt over various processing heads in the proper functional condition.

Figure 2:
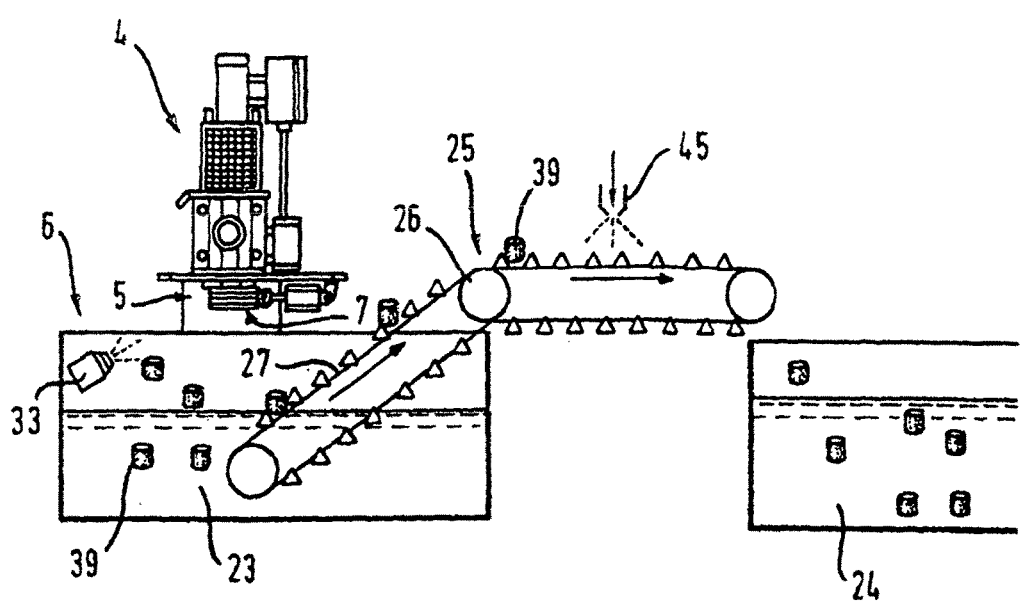
FIG. 2: shows a schematic representation of the diverter valve, the portioning means associated to the diverter valve and the cooling device associated to and arranged downstream of the portioning means for cooling the melt portions discharged from the diverter valve and portioned, and of the removal conveyor for removing the solidified chunks of material.

As shown in FIG. 2, a portioning device 5 is associated to the diverter valve, which portions the melt discharged into handy melt portions, in particular splits the melt strand exiting from the discharge opening 38 of the diverter valve 4 into melt clots of about equal size each, which by cooling then at least partly solidify and form chunks of material 39, which after further cooling and drying can again be processed in a recycling circuit 40, for example can be supplied to the melt generator. As an alternative to a direct recirculation of the chunks of material 39 into the melt generator, the chunks of material 39 can however also be recycled and be processed further in some other way. For example, they initially can also be stored only temporarily, in order to then define the use depending on the future requirements. The chunks of material 39 need not again be supplied to the processing plant, from which they were discharged. Rather, the chunks of material 39 also can be supplied to other uses, for example for a pipe extrusion or other applications in which a corresponding material is required, wherein here possibly further preliminary or intermediate processing steps can be performed, for example a comminution or mixing with other substances.

According to a first embodiment which is shown in FIGS. 3-7, the portioning device 5, which is arranged at the discharge opening 38 of the diverter valve 4, can include a splitter head 8 movably mounted relative to the diverter valve 4, which is part of a carriage 14 which can linearly be reciprocated relative to the diverter valve 4. Said splitter head 8 comprises a plurality of melt channels 9 and 10, which are formed separate from each other and have various orifice regions. With their inlet openings, the two melt channels 9 and 10 are located directly one beside the other, cf. FIG. 4, whereas the outlet regions of the melt channels 9 and 10 are spaced from each other. This is achieved by a channel routing with different inclinations, cf. FIG. 4.

By means of the carriage 14, the splitter head 8 can be reciprocated relative to the diverter valve 4 such that the two melt channels 9 and 10 move their inlet region over the discharge opening 38 of the diverter valve 4 and depending on the position of the carriage 14 at one time the one melt channel 9 and at another time the other melt channel 10 gets in flow connection with said discharge opening 38. In the process, the respectively other melt channel 9 gets out of flow connection, so that it is cut off from the melt stream discharged.

The melt channels 9 and 10 of the carriage 14 need not directly come in engagement or flow connection with the discharge opening 38 of the diverter valve 4. Advantageously, the splitter 7 can comprise an intermediate or adapter or connecting piece 41 in the form of a nozzle insert, which is stationarily mounted on the diverter valve 4 and is in flow connection with said discharge opening 38. The carriage 14 reciprocates relative to the intermediate piece 41, so that the melt channels in the splitter head 8 come in flow connection with the nozzle opening of the nozzle insert of the adapter piece 41 or get out of flow connection therewith.

Figure 4:
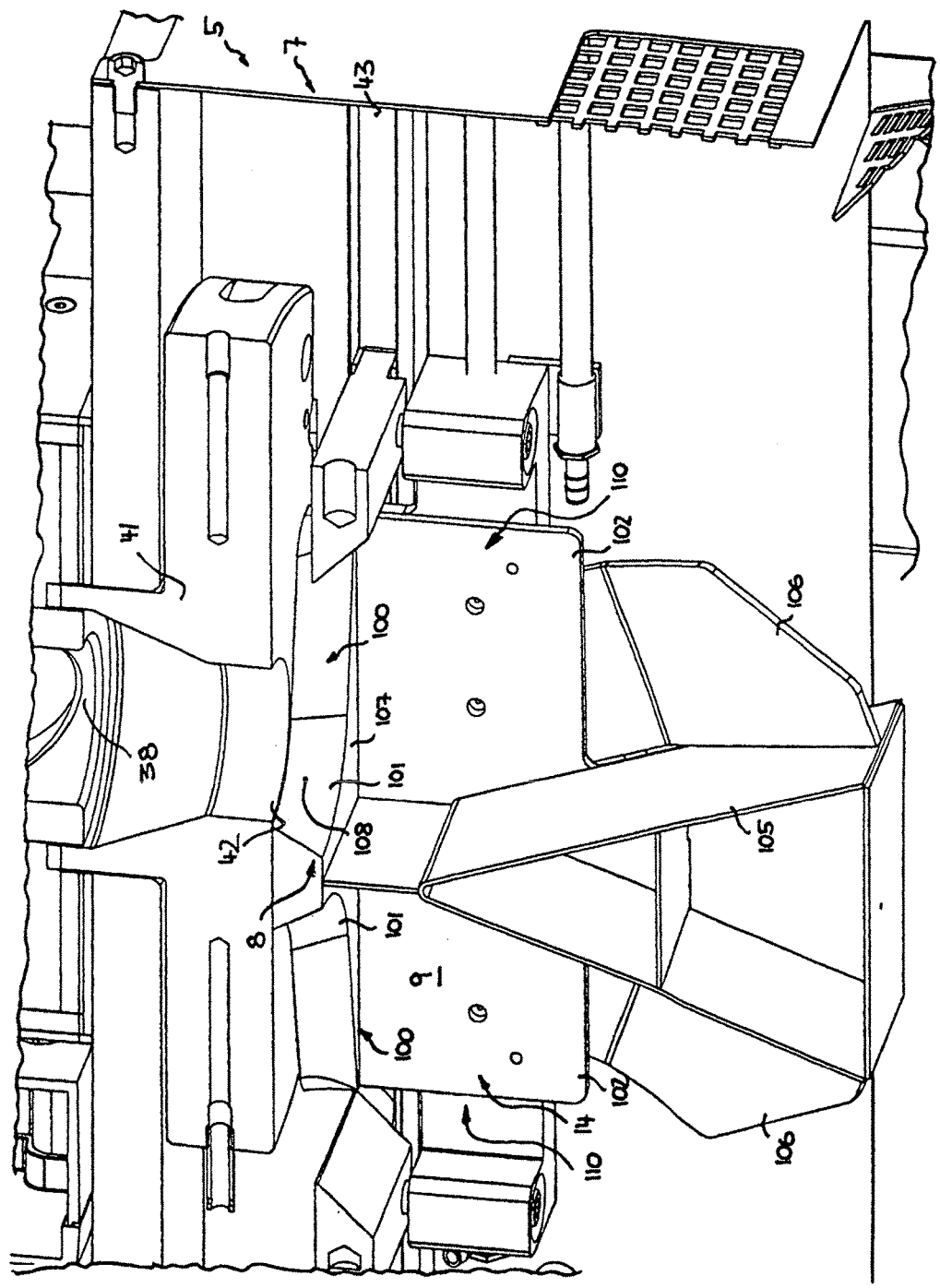
FIG. 4: shows a perspective partial sectional view of FIG. 3, which shows the contouring and the various outlets of the plurality of melt channels.
Figure 7:
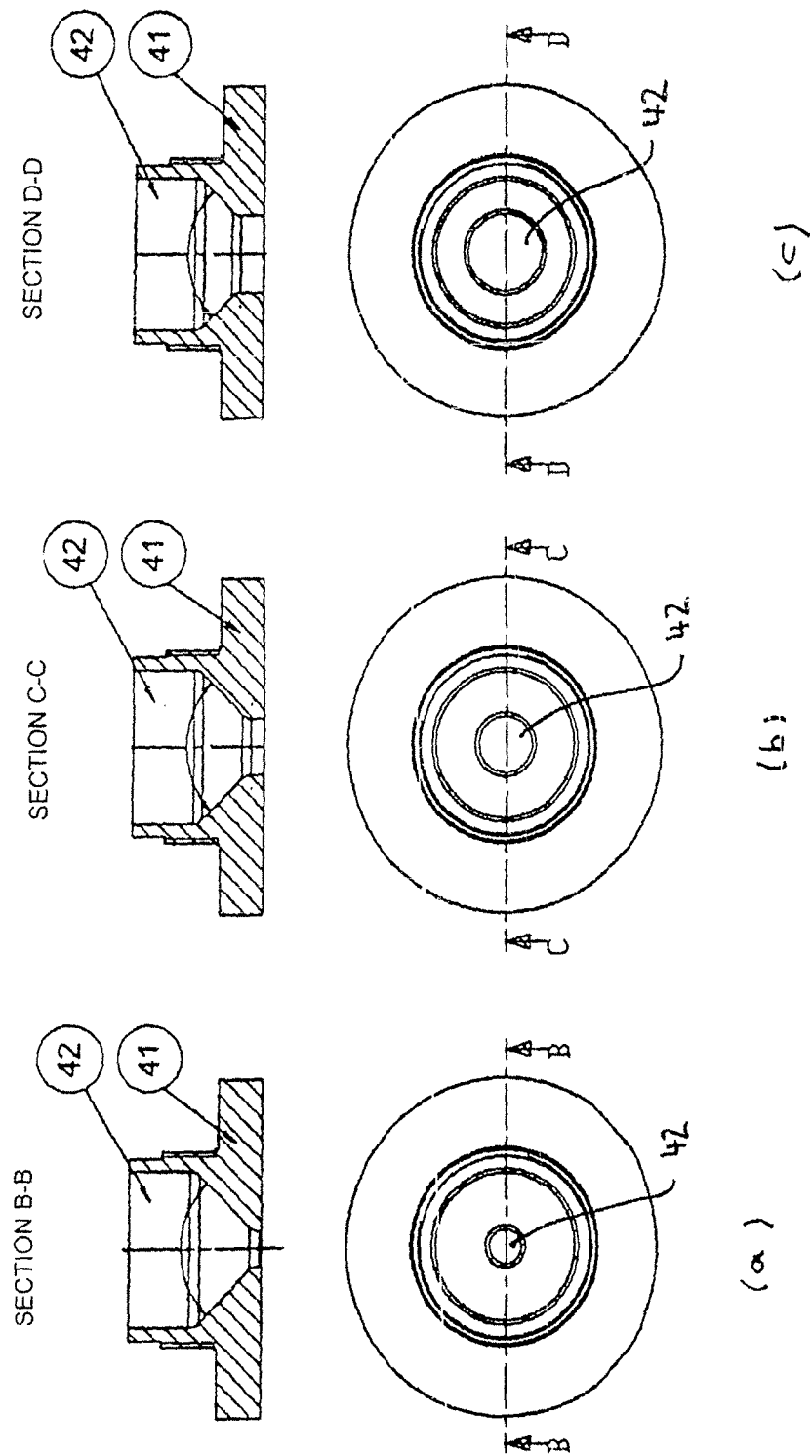
FIGS. 7a-7f show various cross-sectional contouring of the discharge channel according to different embodiments of the invention.

As shown in FIG. 4 and FIG. 7, the inlet of the splitter assembly, which can be formed by said adapter piece 41, can comprise a discharge channel 42 which is tapered in cross-section in flow direction and tapers the outlet cross-section of the discharge opening 38 of the diverter valve 4 to a distinctly smaller diameter.

As shown in FIG. 7, different cross-sectional profiles can be provided here, wherein the taper advantageously is achieved via a substantially conical channel portion which tapers an inlet region of larger cross-section to a nozzle outlet region of smaller cross-section. The flow cross-section of the adapter piece 41 in particular can be adapted to the viscosity of the melt discharged, wherein expansions in diameter eventually can also be possible. For a plurality of melts, however, a nozzle-shaped cross-sectional taper will be helpful, in particular for usual melts as they are employed in underwater pelletizers. Advantageously, the outlet cross-section of the nozzle insert can be less than 75%, preferably less than 50% and in particular about 25%-50% of the inlet cross-section, depending on the material and viscosity of the melt, cf. FIG. 7.

As shown by the various representations a-f of FIG. 7, said discharge channel 42 can have various cross-sectional contourings, e.g. in the form of round, in particular circular cross-sections, as shown in FIGS. 7a-7c, or also in the form of angular contourings, as shown in FIGS. 7d-7f, in which by way of example a square, a triangular and a star-shaped cross-sectional contour of the discharge channel 42 are shown. It should be noted, however, that other cross-sectional contourings also can be provided, as explained above, in order to form the melt clots in the desired way, e.g. round, cylindrical or in a broader sense spherical or elliptical melt clots.

As shown in FIGS. 3-6, the carriage 14 can linearly shiftably be guided or mounted on a preferably plate-shaped carrier 43, wherein said carrier 43 carries or includes the aforementioned adapter piece 41 and is mountable to the diverter valve 4. For this purpose, said carrier 43 advantageously can have a mounting surface adapted to the contour of the diverter valve 4.

Figure 3:
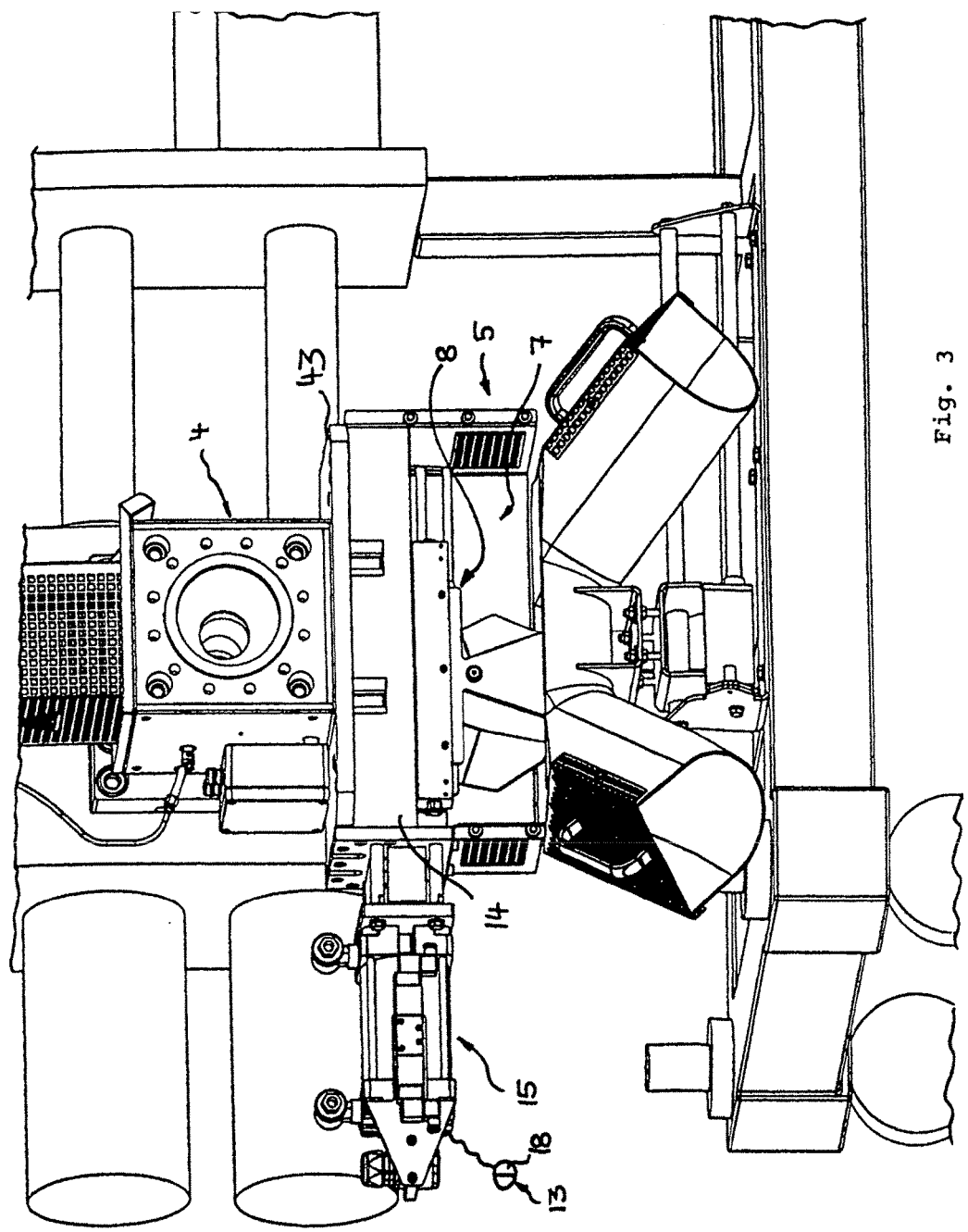
FIG. 3: shows a schematic side view of the splitter head of the portioning device, wherein the reciprocable carriage and the carriage drive provided for this purpose are illustrated.

To be able to reciprocatingly drive the carriage 14, a carriage drive 15 can be provided, which in the depicted embodiment constitutes a pressure-medium cylinder, but can also be configured differently, as has been explained above. As shown in FIG. 3, the carriage drive 15 on the one hand can be connected with the carriage 14 and on the other hand be articulated to the carrier 43.

By reciprocating the carriage 14, the plurality of melt channels 9 and 10 in the splitter head 8 alternately get in flow connection with the discharge opening 38. When a melt channel is in flow connection with the discharge opening, the respective other melt channel is out of flow connection. As a result, the exiting melt strand is split into corresponding pieces. By an only schematically represented control device 13, the carriage drive 15 is actuated in the desired way, in order to achieve the splitting of the melt in the desired way. In particular, control means 18 can vary the driving speed and frequency, in order to vary the portion size or control the same in the desired way or adjust the same to a desired portion size.

Figure 5:
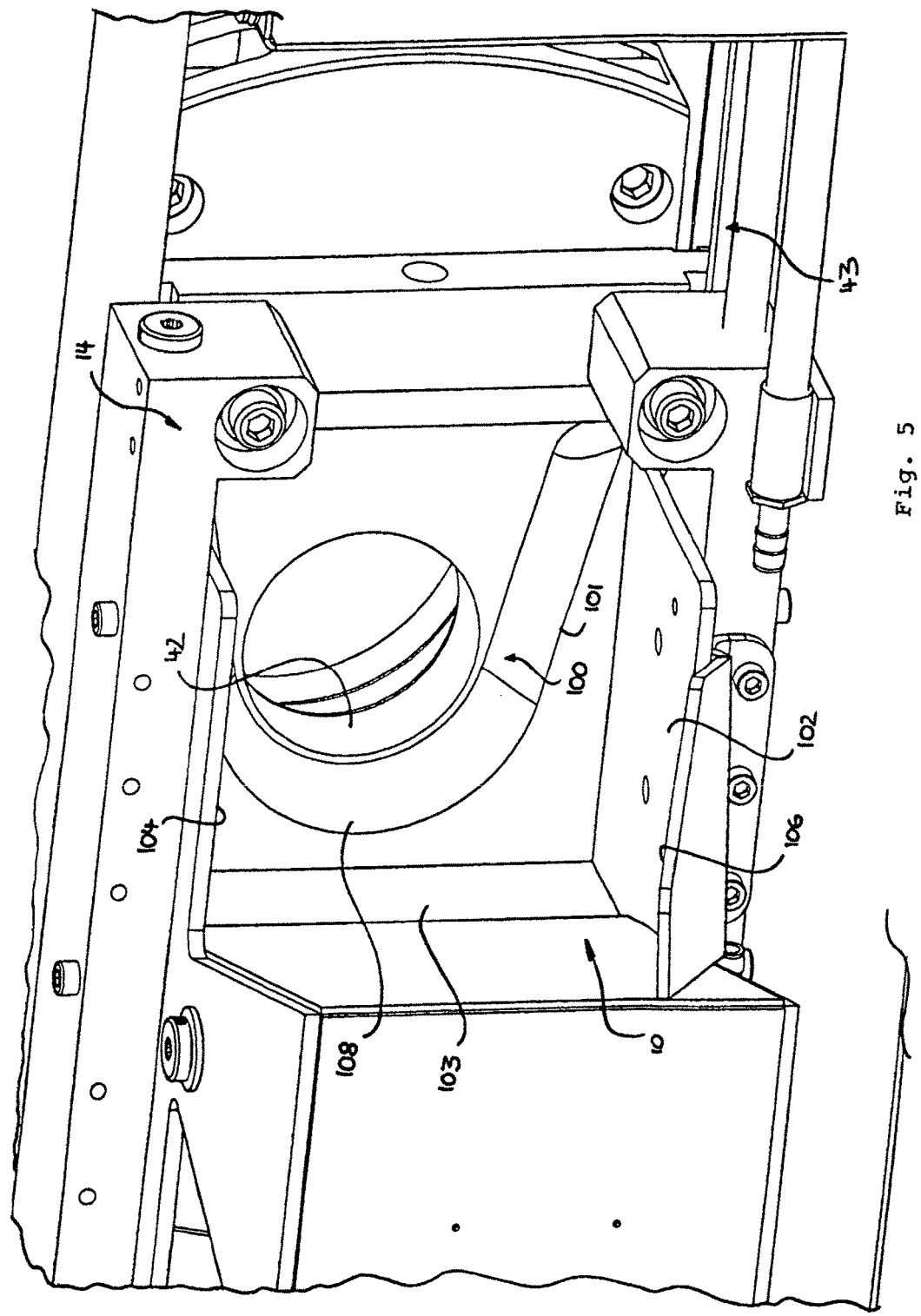
FIG. 5: shows an oblique view of the splitter head into one of the melt channels, wherein the inlet contouring of the melt channel of the distributor head and the outlet contour of the discharge channel flow-connected therewith is shown.
Figure 6:
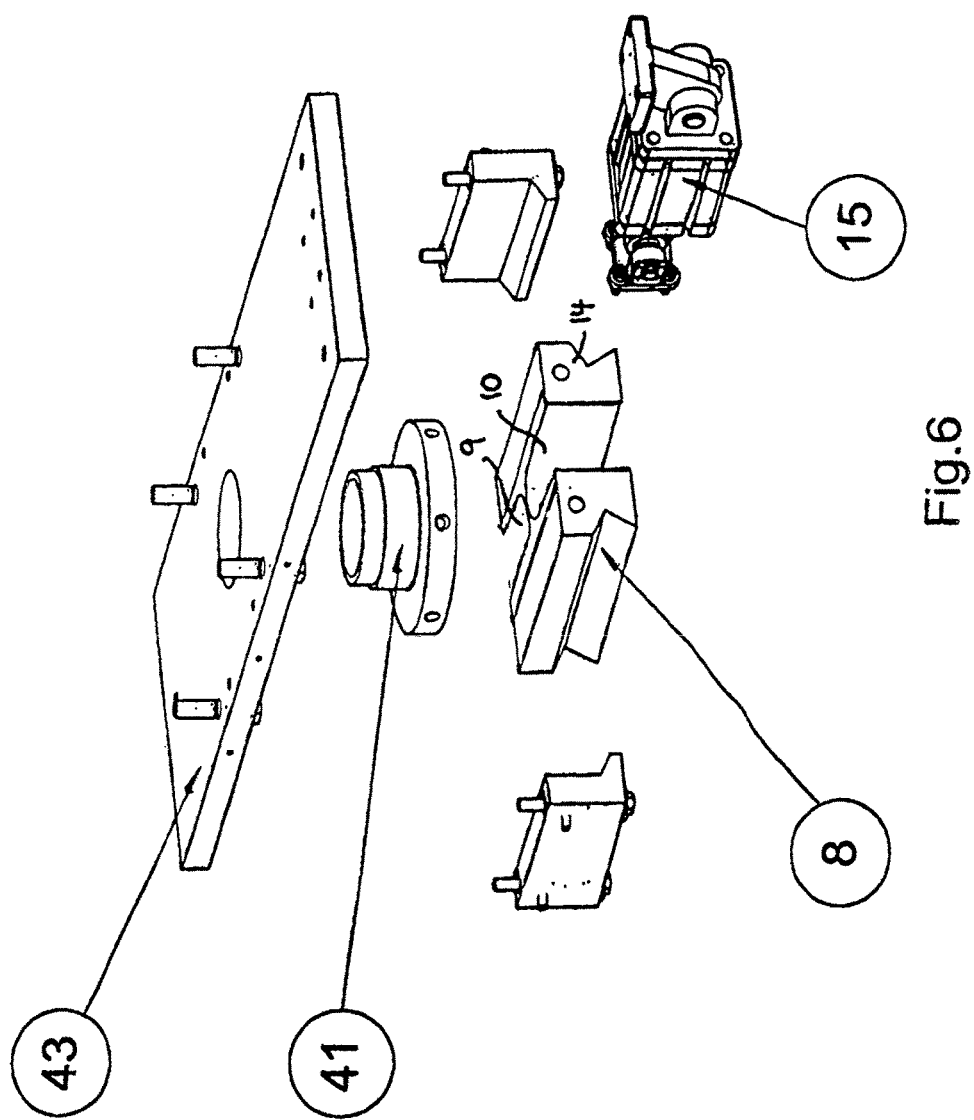
FIG. 6: shows a perspective exploded representation of the splitter of FIGS. 3-5, FIG. 7: shows a sectional view of various nozzle inserts of the portioning device of FIGS. 3-6, wherein representations

As is shown best in FIGS. 4 and 5, the melt channels 9 and 10 are dimensioned and formed distinctly different in terms of cross-sectional shape and cross-sectional dimension as compared to the discharge channel 42 which comes from the diverter valve 4. In particular, the melt channels 9 and 10 in the movable splitter head 8 have a cross-sectional area larger by a multiple than the outlet cross-section of said discharge channel 42.

In their inflow portions, which adjoin the outlet cross-section of the discharge channel 42, the melt channels 9 and 10 have a step-like cross-sectional enlargement which forms an overhang which acts as tear-off edge, in order to detach the melt entering into the melt channels 9 and 10 from the walls of the splitter head 8.

In the region of said cross-sectional enlargement 100, not only the cross-sectional area of the melt channels 9 and 10 increases abruptly, but also the cross-sectional shape thereof. As shown in particular in FIG. 4 and FIG. 5, the melt channels 9 and 10 on the inlet side are defined by an inlet web 101 which is widened in inflow direction in a funnel-shaped or conical manner. Subsequent to said inlet web or inlet collar 101, the channel cross-section is widened abruptly, wherein said melt channels 9 and 10 have a polygonal, in particular rectangular contouring downstream of said inlet collar 101.

Directly subsequent to the inlet collar 101, each of the melt channels 9 and 10 has an approximately cuboid contouring, which towards the outlet of the melt channels 9 and 10 transitions into a beveled, faceted cross-sectional contouring, i.e. the side walls 102, 103 and 104 initially oriented substantially vertically will transition into obliquely oriented channel walls 105, 106 at an angle to the vertical.

The channel portion of the melt channels 9 and 10 adjoining the inlet collar 101 each is set back with respect to the inlet collar 101 or distinctly larger in its cross-sectional dimension, so that between the inlet collar and the adjoining angular channel portion an undercut 107 is obtained, cf. FIG. 4.

The melt channels provided in the splitter head in principle can be formed in a conventional way as tubular channels completely closed on their circumference. Alternatively, the melt channels according to a development of the invention can, however, also be formed open on the circumference towards one side and/or have an open circumferential sector or portion 110 of e.g. 10% to 50% of the channel circumference. When formed as carriage, in particular the channel walls arranged towards the end faces of the carriage, i.e. towards the sides located on the end face in direction of travel, can be missing or the channels can be formed open towards said end faces. A circumferential side of the channel open towards an outside of the splitter head provides for considerably easier cleaning.

As shown in FIGS. 4 and 5, the inlet collars 101 of the melt channels 9 and 10 each are contoured parabolic or V-shaped, more exactly in the form of a rounded V, so that the inlet opening of the melt channels 9 and 10 defined by the inlet web or inlet collar 101 widens towards the opposed end faces of the carriage 14, i.e. the legs of said V diverge symmetrically to the direction of travel of the carriage, wherein the connecting portion of the leg of the V or the parabola is arranged towards the transition region between the two melt channels 9 and 10. Said transition region between the diverging legs of the inlet opening is adapted to the cross-sectional contour of the discharge channel 42, cf. FIG. 5, so that on opening, more exactly on reaching the completely open position of the respective melt channel 9 and 10 an abrupt widening of the channel cross-section is effected.

The cross-sectional sectors 108 of the inlet opening of the melt channels 9 and 10, which are adapted to the shape of the discharge channel 42, are located on the side of those melt channels 9 and 10 which on opening of the melt channels 9 and 10 first open the discharge channel 42. Having a look at the melt channel 10 shown in FIG. 5, the melt channel 10 or the carriage 14 travels to the left on opening of said melt channel 10, wherein the left edge region of the inlet opening of the melt channel 10 is adapted to the shape of the outlet cross-section of the discharge channel 42, as mentioned above. Against the opening direction, i.e. to the right according to FIG. 5, the legs of the inlet collar 101 or of the inlet opening of the melt channel 10 defined thereby diverge.

Figure 8:
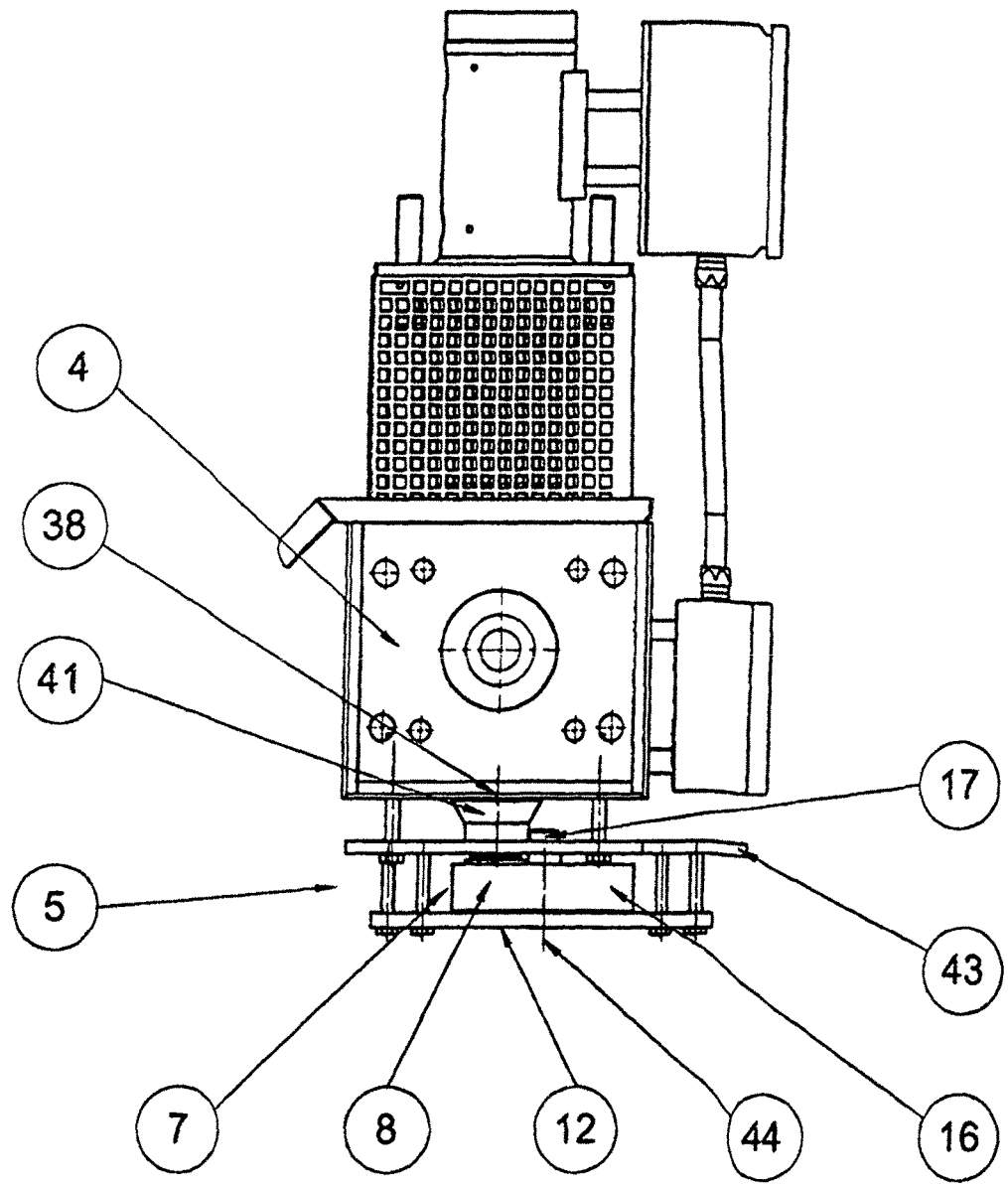
FIG. 8: shows a side view of a portioning device associated to the diverter valve according to a further advantageous embodiment of the invention, in which a rotatorily drivable distributor head is provided.
Figure 9:
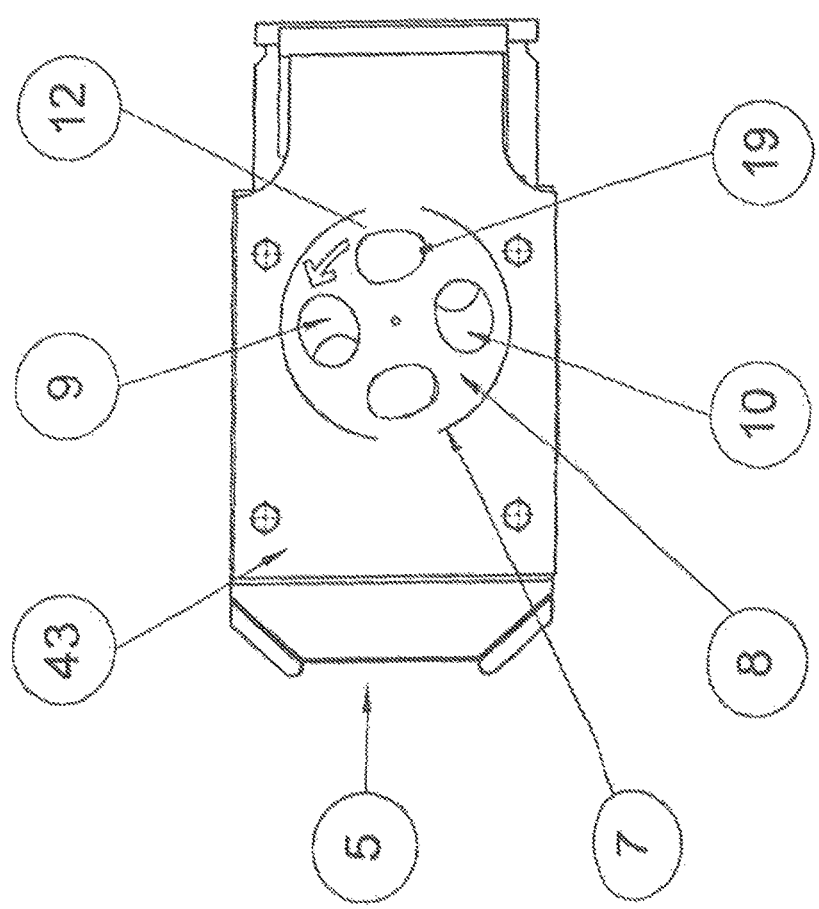
FIG. 9: shows a top view of the portioning device of FIG. 8, which shows the splitter head from below.

As an alternative to the carriage solution shown in FIGS. 3-7, the splitter 7 also can comprise a rotatorily movable splitter head 8, as is shown by the embodiment according to FIGS. 8 and 9. The splitter head 8 can be formed substantially plate-shaped and include a plurality of through bores which form the melt channels 9 and 10, wherein the number of the melt channels can vary. Advantageously, at least two melt channels are provided here, but it is also possible to employ more than two melt channels. In the depicted embodiment, four of such melt channels are formed in the splitter head 8.

The melt channels 9 and 10 are arranged on a common pitch circle around the axis of rotation 44, so that during the rotation of the splitter head 8 they circulate on the same path of circulation. The axis of rotation 44 is substantially parallel to the longitudinal direction of the discharge channel of the diverter valve 4 and/or substantially parallel to the longitudinal direction of the nozzle opening of the intermediate piece 41. Like in the preceding embodiment, an adapter piece 41 also can advantageously be employed in the embodiment according to FIGS. 8 and 9, which is rigidly mountable on the discharge opening 38 of the diverter valve 4, in particular by means of the carrier 43 explained already, on which the splitter head 8 is movably mounted.

By rotating the splitter head 8, another melt channel 9 or 10 each gets in flow connection with the nozzle opening of the intermediate piece 41 and hence with the discharge opening 38 of the diverter valve 4, whereas the respective other melt channels are cut off from the outflowing melt. In this way, a portioning of the exiting melt strand correspondingly is achieved. By varying the rotational speed of the splitter head 8 or the frequency with which the splitter head 8 is advanced rotatorily, the melt portion size also can be adjusted here. The rotation of the splitter head 8 can be effected by a suitable rotary drive 17, which in principle can be formed in various ways, for example in the form of an electric motor with an associated gear stage, so as to be able to adjust the desired speed and possibly also vary the same.

The melt channels of this rotatory splitter head 8 are formed analogous to the above-described embodiment according to FIGS. 3-5, so that reference is made to the above embodiment.

The splitter head 8 and the intermediate or connecting piece 41 possibly can also be coated completely with a function layer or a functional surface layer in particular in the region of the melt channels 9 and 10 and of the discharge channel 42 and advantageously also in the region of the surfaces forming friction pairings, in order to support a detachment of the plastic melt and to avoid sticking, but also to avoid or at least reduce wear and abrasions on the friction pairing surfaces. The splitter head 8 and said intermediate or connecting piece 41 advantageously can be fabricated of suitable high-temperature steels.

As shown in FIG. 2, the cooling device 6 in particular can comprise cooling means 33 which cool the melt directly on portioning or directly after portioning. Said cooling means 33 for example can be formed as spray cooling means, which spray a cooling liquid onto the exiting melt strand which exits from the splitter 7. Alternatively or in addition, said cooling means 33 also can comprise an air or gas cooler which directs cooling air or cooling gas onto the melt strand. Alternatively or in addition, the cooling means 33 in turn also can comprise a contact cooler which has a cooling surface which gets in contact with the melt strand. For example, the splitter head 8 and/or the diverter valve 4, in particular its discharge side, can be cooled in a suitable way, for example by a liquid circuit cooling, so that the melt is precooled already when it is portioned, so that the melt possibly also has already started to solidify when it is portioned.

Furthermore, the cooling device 6 advantageously comprises at least one cooling station downstream of the portioning device 5, in particular in the form of a cooling bath 23 which is arranged below the portioning device 5, so that the split melt portions can fall directly into said cooling bath by gravity. The cooling bath 23 can be formed with one circuit or also with two circuits as required in the manner described above, so as to be able to maintain the desired coolant temperature. In said cooling bath 23 a solidification of the melt portions is effected to obtain handleable chunks of material 39.

When an underwater pelletizer is used as processing plant, as shown in FIG. 1, the water or liquid circuit 36 of the underwater pelletizer advantageously can also be used for tempering and/or cooling the cooling bath 23 and/or a further cooling bath 24. As shown in FIG. 1, heat can be removed from the cooling bath 23 via heat ex-changers 46 and 47 and be used for preheating the water circuit 36, wherein said water circuit 36 and its cooling means also can simply be used only for cooling or tempering the cooling bath 23 on demand. Alternatively or in addition, the heat withdrawn from the cooling bath 23 and/or the cooling bath 24 via a heat exchanger 48 can also be used for preheating for example drying air used in a downstream drying station 30.

To be able to separate the chunks of material 39 from the liquid of the cooling bath 23, a removal conveyor 25 is provided in accordance with a development of the invention, which advantageously can be formed as belt conveyor 26 and advantageously can comprise a belt portion extending in the cooling bath 23, in particular below its level, and a belt portion extending outside the cooling bath 23.

Figure 10:
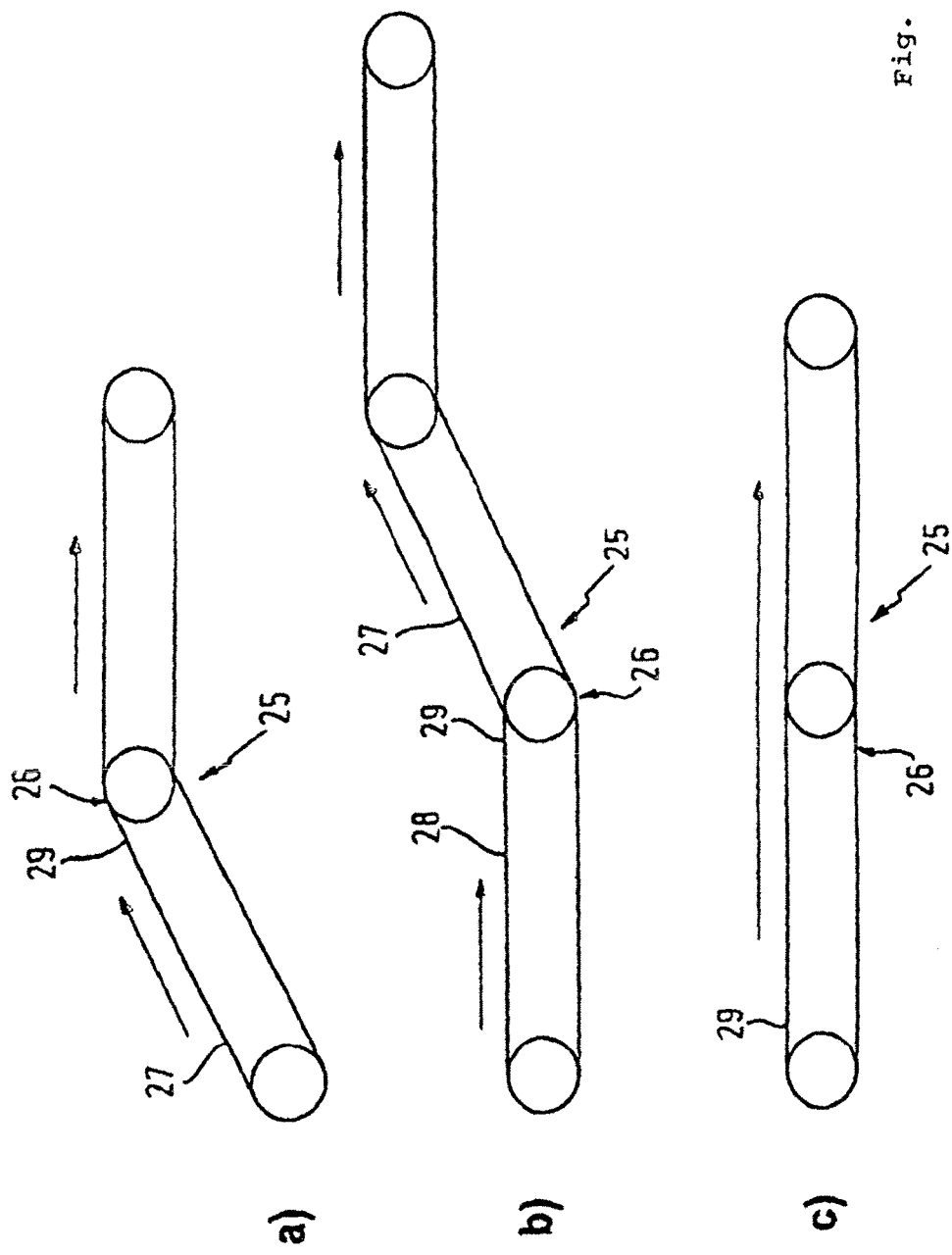
FIG. 10: shows a schematic representation of various embodiments of the removal conveyor for removing the portioned melt or chunks of material, wherein the partial view a) shows a configuration of the removal conveyor for collecting chunks of material floating in a cooling bath, the partial view b) shows a configuration of the removal conveyor for chunks of material not floating in a cooling bath, and the partial view c) shows a configuration of the removal conveyor for air or spray cooling.

As shown in FIG. 10, the belt conveyor 26 advantageously can comprise a collecting portion 27 inclined at an acute angle to the horizontal, which passes through the level of the cooling bath 23 and collects chunks of material 39 floating on the cooling bath 23 and removes the same from the cooling bath 23, cf. FIG. 10, partial view a).

Alternatively or in addition, said belt conveyor 26 also can comprise a collecting portion 28 arranged on the bottom of the cooling bath 23, so as to be able to collect and carry away chunks of material 39 sinking or going down. Such bottom-side collecting portion 28 possibly can be combined with a collecting portion 27 for collecting and carrying away floating chunks of material 39, cf. partial view b) of FIG. 10.

Alternatively or in addition, a substantially flat formation of the removal conveyor 25 can also be provided, for example when a cooling bath 23 is omitted and instead an air or spray cooling is provided.

Such air and spray cooling can also be provided when a cooling bath 23 is provided, for example in the region of the portion of the removal conveyor 25 extending outside the cooling bath 23. Such further cooling means 45 for cooling the chunks of material 29 transported out of the cooling bath 23 are shown with reference numeral 45 in FIG. 2.

Alternatively or in addition, a further cooling bath 24 can be provided downstream of the cooling bath 23, which advantageously can have a larger volume than the first or preceding cooling bath 23 and/or a lower coolant temperature.

As shown in FIG. 1, a removal conveyor 25 again is associated to the further cooling bath 24, so that the chunks of material 39 immersion- and/or floating-cooled again can be separated and carried away from the bath.

After the last cooling bath, further cooling means, in particular also a drying device 30, can be associated to or provided downstream of the removal conveyor 25. As described above, this drying device 30 can be a stationary drying station 31 for example in the form of a centrifugal drier, into which the removal conveyor 25 supplies the chunks of material 39 for drying. Alternatively or in addition, the drying device 30 also can operate in throughfeed and comprise a continuous drier 32 through which the removal conveyor 25 moves the chunks of material 39, i.e. the chunks of material 39 are dried, while they are removed and transported further. As described above, such continuous drier 32 for example can comprise a fan cooling or a spray cooling or the like.

Figure 11:
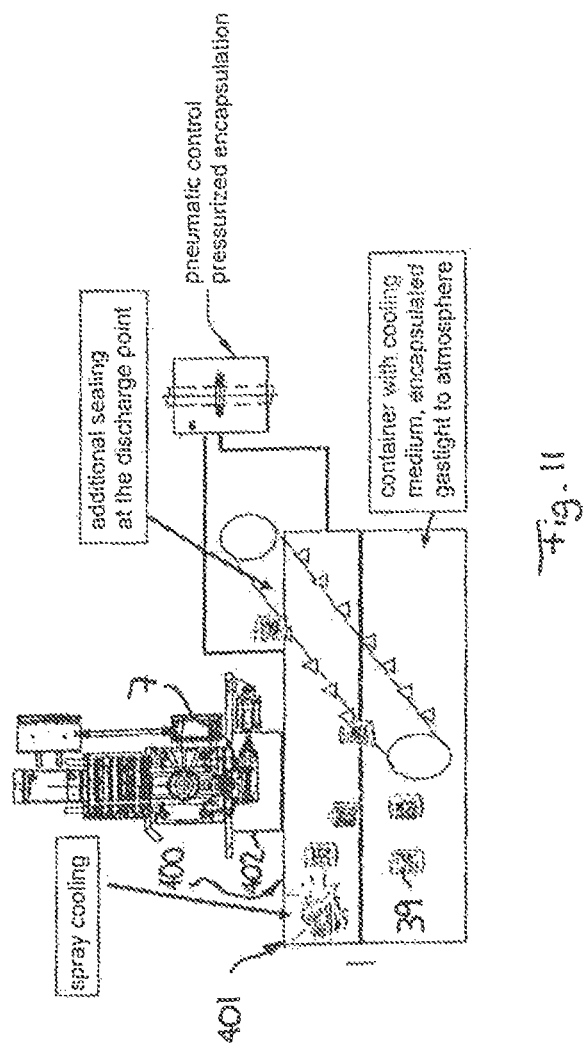
FIG. 11: shows a schematic representation of a melt processing plant similar to FIG. 1 according to a further embodiment of the invention, wherein the splitter and succeeding conveying and processing means are encapsulated in a gas-tight manner, in order to protect the split melt portions against a reaction with the surrounding atmosphere and to prevent the exit of volatile constituents to the environment.

As shown in FIG. 11, an atmosphere generator 400 for charging the melt portions 39 split or to be split with a defined atmosphere can be associated to or be arranged downstream of the splitter 7.

The atmosphere generator 400 in particular can comprise an encapsulation 401 formed substantially gas-tight, by means of which the splitter 7 and its succeeding outlet region are encapsulated and shielded with respect to the surrounding atmosphere.

In particular, the splitter 7 can be enclosed by a container 402 in which an overpressure and/or a supply of shielding gas or some other atmosphere, e.g. also a vacuum, might be provided.

As is furthermore shown in FIG. 11, downstream plant components, such as the cooling bath 23 and/or the removal conveyor 25 can be enclosed by similar containers or also by said container 402, when the same is formed large enough, wherein different container portions can be connected with each other in a gas-tight manner.

Figure 12:
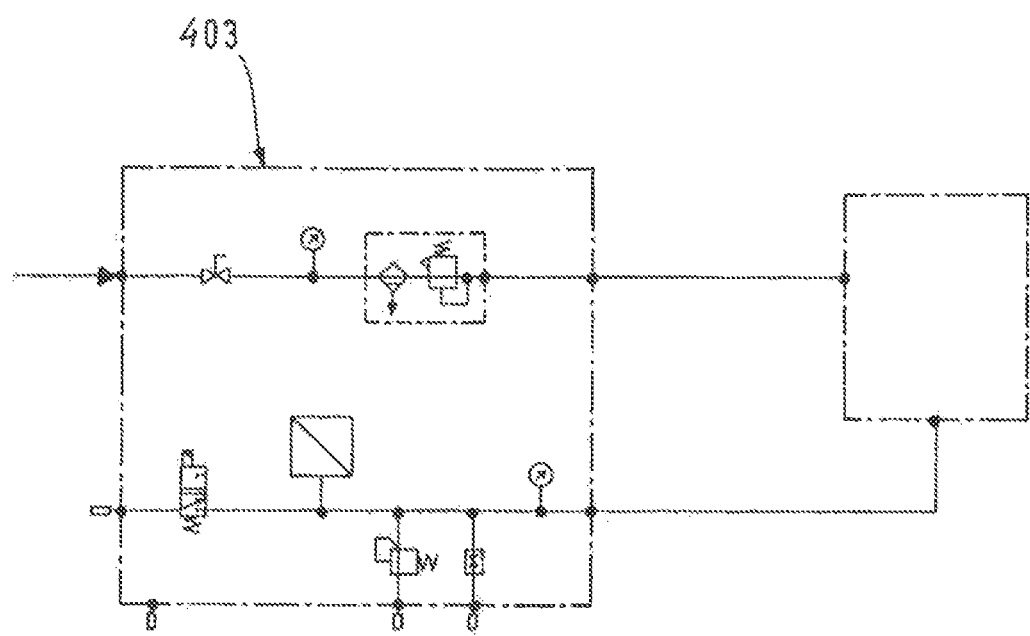
FIG. 12: shows a schematic representation of a circuit for controlling the application of gas and/or compressed air onto the encapsulated region of the plant of FIG. 11.

The interior space enclosed by the container 402 can be charged with gas or compressed air or a mixture thereof by means of the gas and/or compressed-air circuit 403 as shown in FIG. 12. Such pneumatic control circuit 403 for example can include pressure control modules such as shut-off elements, pressure gauges and pressure control and/or limiting elements, e.g. in the form of corresponding valves.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

The invention claimed is:
1. A melt processing plant, comprising:
a melt charger for charging a processing head with melt;
a diverter valve between the melt charger and the processing head for discharging the melt past the processing head;
a splitter for splitting the discharged melt strand flowing out of the diverter valve into melt portions, said splitter including a movable splitter head with a plurality of melt channels, each of said plurality of melt channels being brought cyclically into flow connection with a discharge channel coming from the diverter valve by moving the splitter head, the discharge channel having an outlet; and
the melt channels of the splitter head having at least a step-like cross-sectional enlargement in their inflow portion, a cross-sectional shape different from the outlet cross-section of the discharge channel, and an open orifice region out of the splitter, upstream of the step-like cross-sectional enlargement the melt channels having an at least partly rounded cross-sectional shape and downstream of said cross-sectional enlargement the melt channels having a polygonal cross-sectional shape.

2. The melt processing plant according to claim 1, wherein the step-like cross-sectional enlargement forms a tear-off edge with overhang, in the region of which the melt at least partly detaches from walls of the melt channel to freely hanging and downstream of which the freely hanging melt drips off and/or driven by gravity exits through the melt channels and/or out of the melt channels.

3. The melt processing plant according to claim 1, wherein in the region of the step-like cross-sectional enlargement the melt channels of the splitter head also change their cross-sectional shape in addition to the size of the cross-section.

4. The melt processing plant according to claim 1, wherein the inflow cross-sections of the melt channels of the splitter head each are larger than the outflow cross-section of the discharge channel and the orifice of the discharge channel at least partly forms a tear-off edge for the melt flowing into the splitter head.

5. The melt processing plant according to claim 1, wherein the melt channels each have an open circumferential portion without walls on their circumference.

6. The melt processing plant according to claim 1, wherein the melt channels each have an inlet opening whose circumferential contour includes a first portion which is adapted to the shape of an outlet contour of the discharge channel, and a second portion which is contoured differently from the outlet contour of the discharge channel.

7. The melt processing plant according to claim 6, wherein the first portion is located on the side of the respective melt channel which, upon opening of the melt channel, first clears the cross-section of the discharge channel.

8. The melt processing plant according to claim 6, wherein the inlet openings of the melt channels each are contoured to have a round V shape and/or parabolic shape.

9. The melt processing plant according to claim 1, wherein downstream of the cross-sectional enlargement the melt channels each have a cross-sectional area which amounts to at least two times the outlet cross-sectional area of the discharge channel.

10. The melt processing plant according to claim 1, wherein the cross-sectional area of the melt channels is at least doubled at the step-like cross-sectional enlargement.

11. The melt processing plant according to claim 1, wherein the melt channels are formed and arranged in the splitter head such that, independent of the position of the splitter head, there is always one melt channel at least partly in flow connection with the discharge channel coming from the diverter valve.

12. The melt processing plant according to claim 11, wherein the splitter head is part of a carriage which can reciprocably be driven by a carriage drive.

13. The melt processing plant according to claim 1, wherein the splitter head is part of a rotary head which can be rotatably driven by a rotary drive.

14. The melt processing plant according to claim 1, wherein a controller is provided for variably controlling the speed of movement and/or movement frequency of the splitter head relative to the discharge channel.

15. The melt processing plant according to claim 1, wherein between the splitter head and the diverter valve an intermediate or adapter piece is provided, which includes the discharge channel that is connectable to a discharge opening of the diverter valve and can be brought in flow connection with the melt channels in the splitter head.

16. The melt processing plant according to claim 1, wherein the discharge channel has a nozzle-shaped contouring and/or a cross-sectional taper.

17. The melt processing plant according to claim 1, wherein the discharge channel has a rounded cross-sectional contouring.

18. The melt processing plant according to claim 1, wherein the discharge channel has a cross-sectional contouring that is angular and/or rectangular and/or square and/or triangular and/or polygonal and/or star-shaped and/or x-shaped.

19. The melt processing plant according to claim 1, wherein the discharge channel includes a ring-shaped cross-sectional contouring and/or is formed as a ring nozzle for forming an interior of hollow melt portions.

20. The melt processing plant according to claim 19, wherein the ring-shaped cross-sectional contouring includes outer and inner ring surfaces corresponding to each other in terms of contour.

21. The melt processing plant according to claim 15, wherein at least the splitter head and/or the intermediate or adapter piece is provided with a function layer reducing melt sticking and/or supporting detachment of melt.

22. The melt processing plant according to claim 1, wherein a cooling device is provided for cooling the melt portions in a cooling liquid to obtain at least partly solidified chunks of material.

23. The melt processing plant according to claim 22, wherein the cooling device comprises a cooling bath which is arranged below a portioning device and can be reached from the melting device by gravity after exit from the splitter head.

24. The melt processing plant according to claim 23, wherein the cooling bath further comprises a secondary cooling circuit with a heat exchanger arranged outside the cooling liquid for cooling the cooling liquid in which the melt portions are cooled.

25. The melt processing plant according to claim 23, further comprising a heat recovery device for recovering heat to be withdrawn from the melt portions and/or chunks of material, said heat recovery device being associated to the cooling device.

26. The melt processing plant according to claim 25, wherein the heat recovery device includes at least one heat exchanger for recovering heat obtained in the cooling bath.

27. The melt processing plant according to claim 25, further comprising a removal conveyor for removing the at least partly solidified chunks of material from the cooling bath, the removal conveyor being associated to the cooling bath and/or to a further cooling bath.

28. The melt processing plant according to claim 27, wherein the removal conveyor comprises a belt conveyor which includes a first collecting belt portion inclined at an acute angle to the horizontal and extending at least partly into a basin of the cooling bath for collecting floating chunks of material and/or a second collecting belt portion arranged at a bottom of the basin for collecting chunks of material sinking down in the cooling bath.

29. The melt processing plant according to claim 27, wherein the removal conveyor includes a liquid-permeable circulating component.

30. The melt processing plant according to claim 27, further comprising a drying device for at least partly drying the chunks of material removed by the removal conveyor, the drying device being associated to the removal conveyor and including a drying station downstream of the removal conveyor, the drying station including at least one of a centrifugal dryer, a cyclone separator, a moving dryer and a continuous dryer associated to a removal conveyor portion for at least partly drying the chunks of material while removing the same.

31. The melt processing plant according to claim 1, further comprising a cooling device including cooling means arranged proximal to a portioning device for cooling the melt upon and/or directly after portioning, wherein the cooling means includes at least one of an air cooler for charging the melt with cooling air, a gas cooler for charging the melt with cooling gas, a liquid cooler for charging the melt with a cooling liquid and a contact cooler with a cooling surface to be contacted by the melt.

32. The melt processing plant according to claim 1, wherein the diverter valve includes at least one inlet channel for connection with the at least one melt charger, at least one feed channel for connection with the at least one processing head, and a scrap or discharge channel with a discharge opening for discharging the melt past the processing heads, wherein by shifting a movable valve body the at least one inlet channel selectively can be brought in flow connection with one of the feed channels or with the scrap or discharge channel.

33. The melt processing plant according to claim 1, further comprising an atmosphere generator for charging the melt portions split and/or to be split with a defined atmosphere, the atmosphere generator being associated to and/or provided downstream of the splitter.

34. The melt processing plant according to claim 33, wherein the atmosphere generator includes a substantially gas-tight environment encapsulation for isolating the outlet environment of the splitter and/or the environment of downstream processing stations.

35. The melt processing plant according to claim 33, wherein the melt portions exiting from the splitter are charged with an over-pressure and/or a shielding gas by the atmosphere generator.

36. The melt processing plant according to claim 33, further comprising a container connected to the outlet of the splitter, into which the melt portions exiting from the splitter are received, and a pressure generator and/or a gas generator for charging an interior space of the container with overpressure and/or negative pressure and/or a gas or air.

37. The melt processing plant according to claim 36, wherein the container is connected to at least one processing component downstream of the splitter and/or also encloses said at least one downstream processing component so that the melt portions are exposed to the atmosphere existing in the interior space of the container also in the region of said at least one downstream processing component.

38. A melt processing plant, comprising a melt charger for charging a processing head with melt, a diverter valve being provided between the melt charger and the processing head for discharging the melt past the processing head, and including a splitter for splitting the discharged melt strand flowing out of the diverter valve into melt portions, the splitter including a movable splitter head with a plurality of melt channels that, by moving the splitter head, are each brought cyclically into flow connection with a discharge channel coming from the diverter valve, the plurality of melt channels of the splitter head at least having a step-like cross-sectional enlargement in their inflow portion, a cross-sectional shape different from the outlet cross-section of the discharge channel, and an open orifice region out of the splitter, each of the plurality of melt channels having an open circumferential portion without walls on its circumference.

* * * * *